(12) United States Patent
Kawai

(10) Patent No.: US 10,619,668 B2
(45) Date of Patent: *Apr. 14, 2020

(54) TAPERED ROLLER BEARING

(71) Applicant: NTN CORPORATION, Osaka (JP)

(72) Inventor: Takashi Kawai, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/298,146

(22) Filed: Mar. 11, 2019

(65) Prior Publication Data

US 2019/0203762 A1 Jul. 4, 2019

Related U.S. Application Data (63) Continuation of application No. 15/542,181, filed as application No. PCT/JP2016/050147 on Jan. 5, 2016, now Pat. No. 10,288,114.

(30) Foreign Application Priority Data

Jan. 28, 2015 (JP) .................................. 2015-014201
Nov. 9, 2015 (JP) .................................. 2015-219472

(51) Int. Cl.
*F16C 19/36* (2006.01)
*F16C 23/08* (2006.01)
(Continued)

(52) U.S. Cl.
CPC .......... *F16C 19/364* (2013.01); *F16C 19/225* (2013.01); *F16C 23/088* (2013.01);
(Continued)

(58) Field of Classification Search
CPC .... F16C 19/225; F16C 19/364; F16C 23/088; F16C 33/64; F16C 33/585; F16C 33/366;
(Continued)

(56) References Cited

U.S. PATENT DOCUMENTS 4,546,313 A * 10/1985 Moyer .................. G01R 21/04
324/103 P
4,877,340 A 10/1989 Hoeprich
(Continued)

FOREIGN PATENT DOCUMENTS

JP 63-046288 9/1988
JP 4-95318 8/1992
(Continued)

OTHER PUBLICATIONS

International Search Report dated Apr. 12, 2016 in International (PCT) Application No. PCT/JP2016/050147.
(Continued)

*Primary Examiner* — Marcus Charles
(74) *Attorney, Agent, or Firm* — Wenderoth, Lind & Ponack, L.L.P.

(57) ABSTRACT

A raceway surface ($3a$) of an outer ring ($3$) of a tapered roller bearing ($1$) includes a composite crowning surface. The composite crowning surface includes a center curve ($3a1$), which is formed at a center portion in a generating-line direction, and end portion curves ($3a2$ and $3a3$), which are formed on both sides of the center curve ($3a1$) in the generating-line direction. The raceway surface ($3a$) of the outer ring ($3$) is entirely subjected to superfinishing. Each of a ratio ($R_2/R_1$) of a curvature radius ($R_2$) of the end portion curve ($3a2$) to a curvature radius ($R_1$) of the center curve ($3a1$) and a ratio ($R_3/R_1$) of a curvature radius ($R_3$) of the end portion curve ($3a3$) to the curvature radius ($R_1$) is set to 0.02 or more. Each of drop amounts of the end portion curves ($3a2$ and $3a3$) is set to 0.07 mm or less.

5 Claims, 4 Drawing Sheets

(51) Int. Cl.
*F16C 33/58* (2006.01)
*F16C 19/22* (2006.01)
*F16C 33/64* (2006.01)
*F16C 33/36* (2006.01)

(52) U.S. Cl.
CPC ............ *F16C 33/585* (2013.01); *F16C 33/64* (2013.01); *F16C 33/366* (2013.01); *F16C 2220/00* (2013.01); *F16C 2223/02* (2013.01); *F16C 2240/50* (2013.01); *F16C 2361/61* (2013.01)

(58) Field of Classification Search
CPC .............. F16C 2220/00; F16C 2223/02; F16C 2361/61; F16C 2240/50
USPC ................. 384/450, 561, 564–565, 569, 571
See application file for complete search history.

(56) References Cited

U.S. PATENT DOCUMENTS

| | | | |
|---|---|---|---|
| 6,086,261 | A | 7/2000 | Nakagawa et al. |
| 6,254,277 | B1 * | 7/2001 | Nagai ................... F16C 19/364 384/450 |
| 6,267,510 | B1 * | 7/2001 | Herber ................. F16C 13/006 384/449 |
| 6,318,897 | B1 | 11/2001 | Shitsukawa |
| 6,328,477 | B1 | 12/2001 | Tsujimoto |
| 6,502,996 | B2 * | 1/2003 | Joki ...................... F16C 19/364 384/450 |
| 7,090,405 | B2 | 8/2006 | Tsujimoto |
| 8,480,308 | B2 * | 7/2013 | Masuda ................ F16C 19/225 384/564 |
| 8,641,290 | B2 | 2/2014 | Kawaguchi |
| 8,876,397 | B2 | 11/2014 | Matsuyama |
| 10,288,114 | B2 * | 5/2019 | Kawai ................... F16C 33/585 |
| 2001/0031105 | A1 | 10/2001 | Tsujimoto |
| 2002/0044707 | A1 | 4/2002 | Hanai |
| 2004/0264825 | A1 | 12/2004 | Kamamura et al. |
| 2014/0301687 | A1 | 10/2014 | Utada et al. |

FOREIGN PATENT DOCUMENTS

| | | |
|---|---|---|
| JP | 11-201151 | 7/1999 |
| JP | 11-201172 | 7/1999 |
| JP | 2004-322307 | 11/2004 |
| JP | 2005-188738 | 7/2005 |
| JP | 2007-260829 | 10/2007 |
| JP | 2008-223862 | 9/2008 |
| JP | 2013-99818 | 5/2013 |
| WO | 2016/121420 | 8/2016 |

OTHER PUBLICATIONS

International Preliminary Report on Patentability and Written Opinion of the International Searching Authority dated Aug. 1, 2017 in International (PCT) Application No. PCT/JP2016/050147.
Japanese Notice of Reasons for Refusal dated Jan. 31, 2020 in corresponding Japanese Patent Application No. 2015-219472 with English Translation.

* cited by examiner

TAPERED ROLLER BEARING

The present application is a U.S. National Stage Application of International (PCT) Application No. PCT/JP2016/050147, filed on Jan. 5, 2016, which claims priority to Japanese Patent Application No. 2015-014201, filed on Jan. 28, 2015, and Japanese Patent Application No. 2015-219472, filed on Nov. 9, 2015.

TECHNICAL FIELD

The present invention relates to a tapered roller bearing.

BACKGROUND ART

Reduction in size of a transmission unit or a differential unit (hereinafter referred to as "transmission unit or the like") of an automobile has been demanded for the purpose of reducing fuel consumption and increasing a cabin space. Along with such demands, reduction in torque and reduction in size have been demanded also for a tapered roller bearing which is to be assembled in the transmission unit or the like. In order to achieve the reduction in torque and reduction in size of the tapered roller bearing, increase in load capacity has been demanded. For example, in Patent Literature 1, there is described a tapered roller bearing having a roller coefficient (roller filling ratio) which is set to more than 0.94 to improve the load capacity.

In recent years, there has been an increasing demand for reduction in size of the transmission unit or the like, and further increase in load capacity has been demanded also for a bearing which is to be assembled in the transmission unit or the like. Further, for the purpose of reducing the size of the transmission unit or the like, employment of an aluminum housing and reduction in thickness of a housing have been considered. In this case, the stiffness of the entire unit is reduced, and a large moment load is applied to the tapered roller bearing. Consequently, a load condition of the tapered roller bearing becomes stricter. Further, when the aluminum housing is employed, the amount of thermal expansion of the housing is increased, with the result that reduction in preload (which is so-called "preload loss") becomes more liable to occur in the tapered roller bearing. Therefore, more highly functional tapered roller bearing is demanded.

As described above, the demands on the tapered roller bearing have become stricter, and there is difficulty in meeting the demands by only increasing the roller coefficient as in Patent Literature 1.

As a method for further increasing the load capacity of the tapered roller bearing, for example, there has been known a method involving forming each of raceway surfaces of an inner ring and an outer ring into a crowning shape. For example, in Patent Literature 2, there is described a raceway surface including a so-called composite crowning surface. In the composite crowning surface, an arcuate curve having a large curvature radius (large-arc portion) is formed at a center portion of the raceway surface in a generating-line direction, and arcuate curves each having a small curvature radius (small-arc portions) are formed at both end portions of the raceway surface in the generating-line direction. As described above, with the raceway surface including the composite crowning surface, when the large-arc portion formed at the center of the raceway surface and the roller are brought into contact with each other during the normal use, a contact length between the raceway surface and the roller is increased to reduce a surface pressure, thereby being capable of preventing defects such as surface-originating separation in an early stage. Meanwhile, with the small-arc portions formed at the end portions of the raceway surface, the end portions can be recessed toward the side apart from the roller. Therefore, for example, even when a high load is applied to the tapered roller bearing, the contact between the raceway surface of the outer ring and the end portions of the tapered roller is avoided as much as possible, thereby being capable of preventing generation of an excessive edge load.

CITATION LIST

Patent Literature 1: JP 2005-188738
Patent Literature 2: JP 2007-260829

SUMMARY OF INVENTION

Technical Problem

Incidentally, in the tapered roller bearing, a contact surface pressure between the raceway surface of the inner ring and the rolling surface of the roller is typically higher than a contact surface pressure between the raceway surface of the outer ring and the rolling surface of the roller. Therefore, the above-mentioned raceway surface including the composite crowning surface has often been applied to the raceway surface of the inner ring which involves a strict load condition, but actually has almost never been applied to the raceway surface of the outer ring which involves a relatively moderate load condition.

In order to meet the demands in recent years for further increase in load capacity in the tapered roller bearing as described above, the inventor of the present invention has conducted an investigation on application of the composite crowning surface not only to the raceway surface of the inner ring but also to the raceway surface of the outer ring. As a result of the investigation, the following problem has been found. In order to avoid the excessive edge load caused by the contact between the raceway surface of the outer ring and the end portion of the tapered roller, it has been considered preferable that the curvature radius of each of the small-arc portions formed at the end portions of the raceway surface of the outer ring be set as small as possible, that is, the curvature be set as large as possible to cause the small-arc portions to be separated from the rolling surface of the tapered roller as much as possible. However, according to the investigation conducted by the inventor of the present invention, it has been found that, when the curvature of each of the small-arc portions at the end portions of the raceway surface is set excessively large, the cycle time for superfinishing applied to the raceway surface becomes longer, thereby leading to a problem of significant degradation in productivity.

The present invention has an object to improve productivity of a tapered roller bearing in which a composite crowning surface is applied to a raceway surface of an outer ring.

Solution to Problem

The raceway surfaces of the outer ring and an inner ring are typically subjected to the superfinishing after grinding. The superfinishing is performed, for example, in the manner as described in Patent Literature 2. That is, under a state in which a grinding wheel is pressed against the raceway surface of the outer ring or the inner ring being rotated, the grinding wheel is reciprocated along a generating-line direction of the raceway surface (see FIG. 7). The inventor of the present invention performed the above-mentioned superfinishing on the raceway surface of the outer ring which is formed of the composite crowning surface. As a result, it has been found that the cycle time becomes longer as a curvature of each of end portion curves of the raceway surface is larger. The following cause is conceivable.

During the superfinishing, while the grinding wheel machines the raceway surface, the grinding wheel itself is also deformed or worn to conform to the raceway surface. As a result, a favorable contact state between the grinding wheel and the raceway surface is obtained, and a machining efficiency is improved. That is, a large-arc portion formed at the center portion of the raceway surface is polished, with the result that the grinding wheel is worn to conform to the large-arc portion. Then, small-arc portions at the end portions of the raceway surface are polished with the grinding wheel, with the result that the grinding wheel is worn to conform to each of the small-arc portions. At this time, when there is a large difference in curvature between the large-arc portion and each of the small-arc portions, it takes a long time period to cause the grinding wheel, which is worn to conform to the large-arc portion, to conform to each of the small-arc portions, with the result that the machining efficiency during this time period is degraded. Similarly, it also takes a long time period to cause the grinding wheel, which is worn to conform to each of the small-arc portions, to conform to the large-arc portion, with the result that the machining efficiency is further degraded.

Based on the findings described above, according to one embodiment of the present invention, there is provided a tapered roller bearing, comprising: an inner ring comprising a raceway surface having a tapered shape on an outer peripheral surface of the inner ring; an outer ring comprising a raceway surface having a tapered shape on an inner peripheral surface of the outer ring; a plurality of tapered rollers, which are arranged between the raceway surface of the inner ring and the raceway surface of the outer ring so as to be rollable and each comprise a rolling surface having a tapered shape on an outer peripheral surface of each of the plurality of tapered rollers; and a cage which is configured to retain the plurality of tapered rollers at predetermined intervals, wherein the raceway surface of the outer ring comprises a composite crowning surface, the composite crowning surface comprising a center curve, which is formed at a center portion in a generating-line direction and has a curvature radius $R_1$, and end portion curves, which are formed on both sides of the center curve in the generating-line direction and each have a curvature radius $R_2$, $R_3$ which is smaller than a curvature radius $R_1$ of the center curve, wherein the raceway surface of the outer ring is entirely subjected to superfinishing, and wherein each of a ratio $R_2/R_1$ of the curvature radius $R_2$ of the end portion curve to the curvature radius $R_1$ of the center curve and a ratio $R_3/R_1$ of the curvature radius $R_3$ of the end portion curve to the curvature radius $R_1$ of the center curve is set to 0.02 or more, and each of drop amounts of the end portion curves is set to 0.07 mm or less.

The center curve and the end portion curves are not limited to the arcuate curves, and may comprise non-arcuate curves (for example, logarithmic curves). In the case of the non-arcuate curves, the minimum curvature radii of the non-arcuate curves are set to curvature radii $R_1$, $R_2$, and $R_3$.

As described above, in the raceway surface of the outer ring, a difference between the curvature radius $R_1$ of the center curve and each of the curvature radii $R_2$ and $R_3$ of the end portion curves is suppressed within a predetermined range, and each of drop amounts of the end portion curves is set to a predetermined amount or less. As a result, the cycle time for the superfinishing is shortened, and hence the productivity is improved.

It is preferred that, in the above-mentioned tapered roller bearing, each of the drop amounts of both end portions of the raceway surface of the outer ring be set to 0.02 mm or more. With this, the end portions (end portion curves) of the raceway surface of the outer ring can be sufficiently separated apart from the tapered roller. Therefore, the contact between each of the corner portions of the tapered roller and the raceway surface of the outer ring is avoided as much as possible, thereby being capable of reliably preventing generation of the excessive edge load.

Incidentally, when the thermal expansion occurs in the housing to which the outer ring is fixed, the preload having been applied to the tapered roller bearing may be lost, with the result that the outer ring may be moved relative to the tapered roller toward a small-diameter side in an axial direction. In this case, there is a fear in that the rolling surface of the tapered roller overhangs from the raceway surface of the outer ring toward a large-diameter side to cause generation of the excessive edge load. In particular, the aluminum housing may involve a large amount of thermal expansion. Therefore, when the outer ring is fixed to an inner peripheral surface of the aluminum housing, the above-mentioned problem is conspicuous. Also in such a case of occurrence of the thermal expansion, when the preload is increased to prevent occurrence of the preload loss, an excessively large load is applied to the bearing during the normal use, with the result that the lifetime of the bearing is shortened.

In view of the above, it is preferred that a generating-line-direction width of the raceway surface of the outer ring with respect to the roller rolling surface be set so that the rolling surface of the tapered roller (hereinafter also referred to as "roller rolling surface") is prevented from overhanging from the raceway surface of the outer ring toward the large-diameter side even when occurrence of the preload loss in the tapered roller bearing causes the outer ring to move relative to the tapered roller in the axial direction. Specifically, it is preferred that, under a state in which the inner ring, the outer ring, and the plurality of tapered rollers are arranged at normal positions, a generating-line-direction dimension $W_2$ (see FIG. 1) of a region of the raceway surface of the outer ring on the large-diameter side from the rolling surface of each of the tapered rollers be set in consideration of the amount of relative movement of the outer ring, which is caused by the preload loss. For example, when the generating-line-direction dimension $W_2$ of the above-mentioned region is set to 0.6 mm or more, the overhanging of the roller rolling surface from the outer ring raceway surface can be prevented even when the preload loss is liable to occur, for example, even when the outer ring is fixed to the aluminum housing. The "state in which the inner ring, the outer ring, and the tapered rollers are arranged at normal positions" corresponds to a state in which an appropriate preload in the axial direction is applied to the inner ring and the outer ring.

Figure 6:
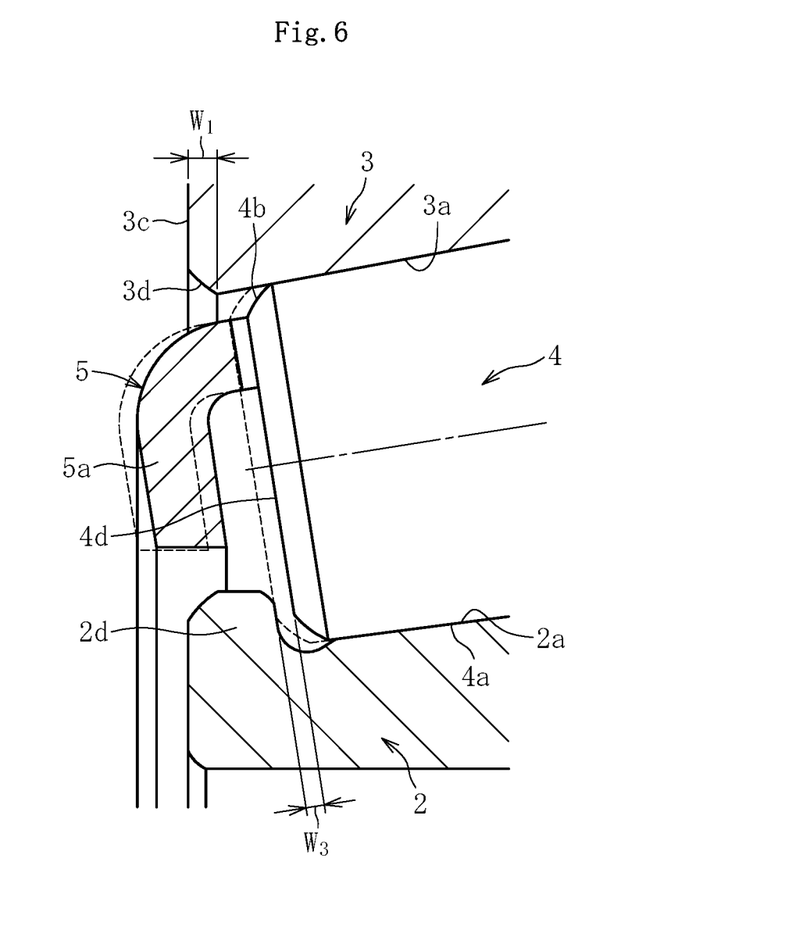
FIG. 6 is an enlarged view of the tapered roller bearing of FIG. 1.

For example, in the tapered roller bearing configured to mainly receive the load in a radial direction among bearings configured to support a rotary shaft of a transmission which takes a horizontal posture, a downward load is applied to the inner ring. In this case, most of the load is applied to the tapered rollers on the lower half among the plurality of tapered rollers which are arranged at equal intervals in a circumferential direction, whereas the tapered rollers which are arranged near an upper end are brought into a substantially no-load state. At this time, the interval between the raceway surfaces of the inner ring and the outer ring sandwiching the tapered rollers near the upper end where substantially no load is applied is slightly increased, and the tapered rollers may be moved relative to the outer ring by the amount of the slight increase in interval toward the small-diameter side in the axial direction (see the dotted lines in FIG. 6). In such a case, in order to prevent overhanging of the roller rolling surface from the raceway surface of the outer ring toward the small-diameter side, it is necessary that the raceway surface of the outer ring be extended toward the small-diameter side from the rolling surfaces of the tapered rollers arranged at the normal positions (see the solid lines in FIG. 6). At this time, under the state in which the inner ring, the outer ring, and the plurality of tapered rollers are arranged at normal positions, a distance $W_3$ between a small-diameter-side end surface of each of the tapered rollers and a small-flange portion of the inner ring is set small. With this configuration, even when the tapered rollers are moved toward the small-diameter side, the movement of the tapered rollers can be regulated by causing the tapered rollers to be brought into abutment against the small-flange portion of the inner ring, thereby being capable of reducing the generating-line-direction width of the raceway surface of the outer ring. Specifically, it is preferred that the above-mentioned distance $W_3$ be set to 0.4 mm or less.

Incidentally, with regard to the end portion curves of the outer ring raceway surface on the small-diameter side, when the drop amounts are to be reduced without changing the curvature radii, for example, it is conceivable to move an axial position of the small-diameter-side end surface of the outer ring toward the large-diameter side, to thereby reduce the width of the end portion curves. However, the interval of the small-diameter-side end surface of the outer ring and the large-diameter-side end surface of the inner ring in the axial direction is often determined in accordance with a device in which the tapered roller bearing is to be assembled (for example, a transmission or the like). Therefore, a position of the small-diameter-side end surface of the outer ring may not be changed unreasonably. In view of the above, when an axial width $W_1$ (see FIG. 6) of a chamfered portion formed on a small-diameter-side end portion of the inner peripheral surface of the outer ring is set large, for example, set to 0.5 mm or more, the width of the end portion curve can be reduced, thereby being capable of setting the drop amount to be small without moving the position of the small-diameter-side end surface of the outer ring.

Alternatively, also when a cylindrical surface is formed between the chamfered portion, which is formed on the small-diameter-side end portion of the inner peripheral surface of the outer ring, and the raceway surface, similarly to the above, the width of each of the end portion curves can be reduced, thereby being capable of setting the drop amount to be small without moving the position of the small-diameter-side end surface of the outer ring.

Advantageous Effects of Invention

As described above, according to the tapered roller bearing of the present invention, the cycle time for superfinishing of the raceway surface of the outer ring comprising the composite crowning surface is shortened, thereby being capable of improving the productivity.

DESCRIPTION OF EMBODIMENTS

Now, a tapered roller bearing according to one embodiment of the present invention is described with reference to the drawings.

Figure 1:
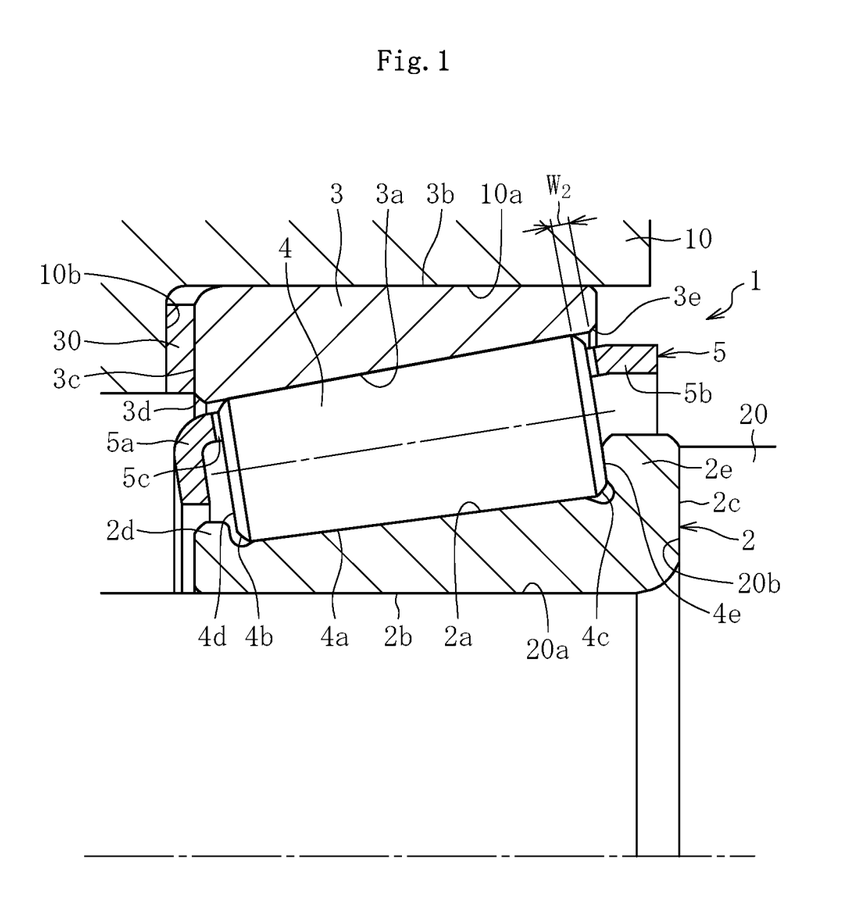
FIG. 1 is a sectional view of a tapered roller bearing according to one embodiment of the present invention, which is taken along an axial direction of the tapered roller bearing.
Figure 2:
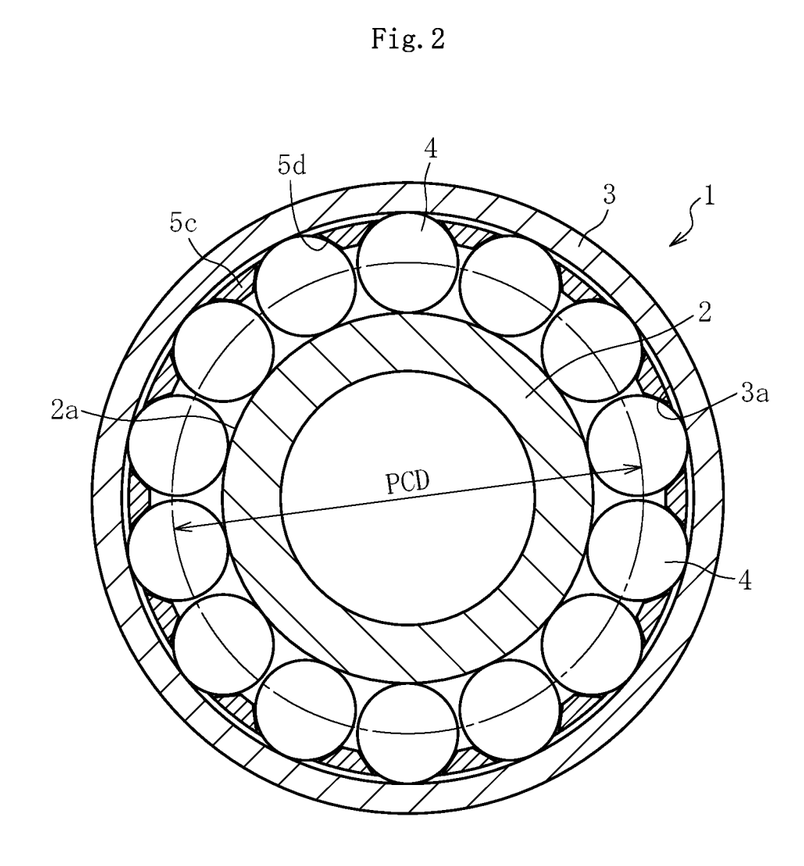
FIG. 2 is a sectional view of the tapered roller bearing, which is taken along a direction orthogonal to the axial direction.

As illustrated in FIG. 1 and FIG. 2, a tapered roller bearing 1 of this embodiment comprises an inner ring 2, an outer ring 3, a plurality of tapered rollers 4, and a cage 5. The inner ring 2 comprises a raceway surface 2a having a tapered shape on an outer peripheral surface thereof. The outer ring 3 comprises a raceway surface 3a having a tapered shape on an inner peripheral surface thereof. The plurality of tapered rollers 4 are arranged between the raceway surface 2a of the inner ring 2 and the raceway surface 3a of the outer ring 3 so as to be rollable and each comprise a rolling surface 4a having a tapered shape on an outer peripheral surface thereof. The cage 5 is configured to retain the tapered rollers 4 at equal intervals in a circumferential direction. The inner ring 2, the outer ring 3, and the tapered rollers 4 are each made of a steel material, such as bearing steel, carburized steel, or stainless steel. The cage 5 is integrally made of metal or resin. In the following description, a small-diameter side (left side in FIG. 1) of the tapered roller 4 in an axial direction (axial direction of the inner ring 2 and the outer ring 3) is referred to as "small-diameter side", and a large-diameter side (right side in FIG. 1) of the tapered roller 4 in the axial direction is referred to as "large-diameter side".

The tapered roller bearing 1 is assembled in, for example, a transmission unit or a differential unit of an automobile. Specifically, as illustrated in FIG. 1, an outer peripheral surface 3b of the outer ring 3 is press-fitted to an inner peripheral surface 10a of a housing 10, and an inner peripheral surface 2b of the inner ring 2 is press-fitted to an outer peripheral surface 20a of a shaft 20. The housing 10 is made of, for example, aluminum. The shaft 20 is made of, for example, chrome-molybdenum steel. A shoulder surface 10b of the housing 10 and a shoulder surface 20b of the shaft 20 sandwich and pressurize an end surface 3c of the outer ring 3 on the small-diameter side and an end surface 2c of the inner ring 2 on the large-diameter side from both sides in the axial direction, to thereby apply a preload in the axial direction to the tapered roller bearing 1. In the illustrated example, a shim 30 is interposed between the end surface 3c of the outer ring 3 on the small-diameter side and the shoulder surface 10b of the housing 10. A thickness of the shim 30 is suitably set so that a magnitude of the preload to be applied to the tapered roller bearing 1 is adjusted.

The inner ring 2 has a small-flange portion 2d and a large-flange portion 2e. The small-flange portion 2d is formed on the small-diameter side of the raceway surface 2a. The large-flange portion 2e is formed on the large-diameter side of the raceway surface 2a. The raceway surface 2a of the inner ring 2 comprises a crowning surface formed of a single curve, or a composite crowning surface formed of a center curve and end portion curves formed on both sides of the center curve. Each curve is formed of an arc or a logarithmic curve.

Figure 3:
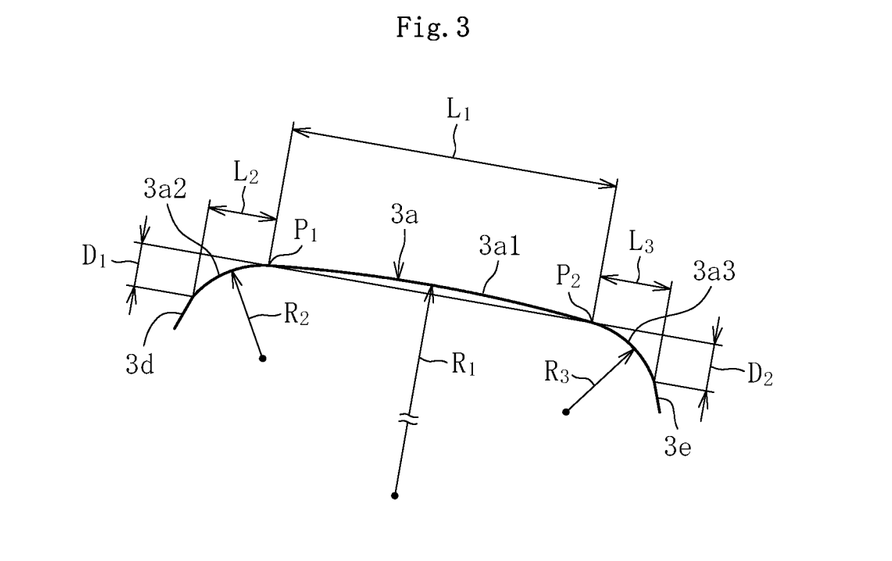
FIG. 3 is a side view for illustrating an outer ring raceway surface of the tapered roller bearing in an exaggerated manner.

As illustrated in FIG. 3, the raceway surface 3a of the outer ring 3 is formed of a center curve 3a1 which is formed at a center portion in a generating-line direction, an end portion curve 3a2 on the small-diameter side which is adjacent to the small-diameter side (left side in FIG. 3) of the center curve 3a1, and an end portion curve 3a3 on the large-diameter side which is adjacent to the large-diameter side (right side in FIG. 3) of the center curve 3al. In this embodiment, the center curve 3a1 comprises an arcuate curve having a curvature radius $R_1$. The end portion curve 3a2 on the small-diameter side comprises an arcuate curve having a curvature radius $R_2$. The end portion curve 3a3 on the large-diameter side comprises an arcuate curve having a curvature radius $R_3$. The center curve 3a1 and each of the end portion curves 3a2 and 3a3 smoothly continue so as to have common tangential lines at borders $P_1$ and $P_2$. In FIG. 3, curvatures of the curves 3a1, 3a2, and 3a3 of the raceway surface 3a are illustrated in an exaggerated manner.

In the outer raceway surface 3a of the outer ring 3, each of a ratio $R_2/R_1$ of the curvature radius $R_2$ of the end portion curve 3a2 to the curvature radius $R_1$ of the center curve 3a1 and a ratio $R_3/R_1$ of the curvature radius $R_3$ of the end portion curve 3a3 to the curvature radius $R_1$ of the center curve 3a1 is set to 0.02 or more, preferably 0.04 or more. Further, each of the ratio $R_2/R_1$ and the ratio $R_3/R_1$ is set to 0.3 or less, preferably 0.1 or less. Each of drop amounts $D_1$ and $D_2$ of the end portion curves 3a2 and 3a3 is set to 0.02 mm or more and 0.07 mm or less. The drop amounts $D_1$ and $D_2$ of the end portion curves 3a2 and 3a3 are widths of the end portion curves 3a2 and 3a3 in a direction orthogonal to a generating-line direction of the raceway surface 3a. Specifically, the generating-line direction of the raceway surface 3a corresponds to a direction of a straight line connecting ends (borders $P_1$ and $P_2$) of the center curve 3a1.

In this embodiment, an axial width $W_1$ (see FIG. 6) of a chamfered portion 3d formed on a small-diameter-side end portion of the inner peripheral surface of the outer ring 3 is set large so that an axial width of the end portion curve 3a2 on the small-diameter side of the raceway surface 3a is set small. With this configuration, without changing an axial position of the small-diameter-side end surface 3c of the outer ring 3, the drop amount $D_1$ of the end portion curve 3a2 on the small-diameter side can be set small. The axial width $W_1$ of the chamfered portion 3d is set to, for example, 0.5 mm or more. Further, in order to secure the drop amount $D_1$ of the end portion curve 3a2 on the small-diameter side to be 0.02 mm or more, the axial width $W_1$ of the chamfered portion 3d is set to, for example, 1.0 mm or less.

Figure 4:
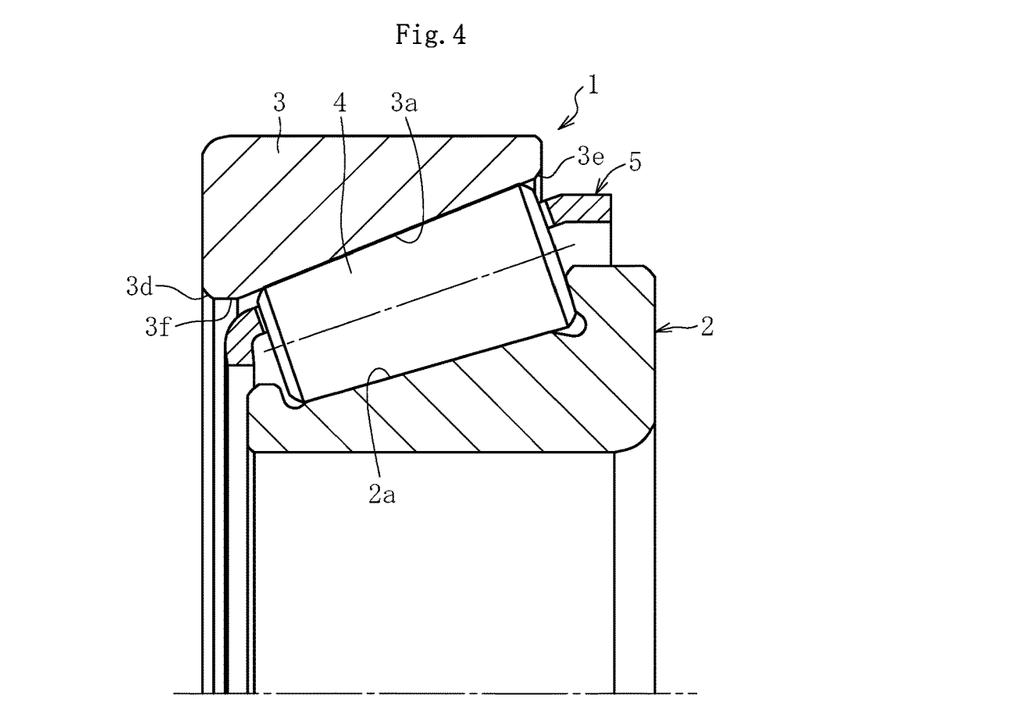
FIG. 4 is a sectional view of another example of the tapered roller bearing, which is taken along the axial direction.

Instead of or in addition to setting the axial width $W_1$ of the chamfered portion 3d to be large, as illustrated in FIG. 4, a cylindrical surface 3f may be formed between the chamfered portion 3d and the raceway surface 3a to suppress the drop amount $D_1$ of the end portion curve 3a2 on the small-diameter side.

The rolling surface 4a of the tapered roller 4 has a substantially linear tapered surface, a crowning surface having a single curve, or a composite crowning surface comprising a center curve and end portion curves formed on both sides of the center curve. At both ends of the outer peripheral surface of the tapered roller 4, there are formed chamfered portions 4b and 4c which are adjacent to the rolling surface 4a.

In the tapered roller bearing 1 of this embodiment, for example, an inner diameter of the inner ring 2 is set within a range of from 15 mm to 120 mm. An outer diameter of the outer ring 3 is set within a range of from 30 mm to 250 mm. A combination width, which is an axial width between the small-diameter-side end surface 3c of the outer ring 3 and the large-diameter-side end surface 2c of the inner ring 2, is set within a range of from 7 mm to 50 mm. Further, in the tapered roller bearing 1 of this embodiment, the tapered rollers 4 are loaded at high density. Specifically, a roller coefficient γ expressed by the following expression is set to γ>0.94.

$$\gamma = (Z \cdot DA)/(\pi \cdot PCD)$$

In the above-mentioned expression, Z represents the number of rollers, DA represents an average diameter of the rollers, and PCD represents a pitch circle diameter of the rollers.

The cage 5 comprises a small-diameter side annular portion 5a, a large-diameter-side annular portion 5b, and a plurality of columnar portions 5c connecting the small-diameter-side annular portion 5a and the large-diameter-side annular portion 5b to each other in the axial direction (see FIG. 1 and FIG. 2). The cage 5 is arranged on a radially outer side of centers of the tapered rollers 4 and at a position of not being held in contact with the outer ring 3. Column surfaces 5d of the columnar portions 5c, which are held in contact with the tapered rollers 4, are inclined so that a gap formed between the column surfaces 5d opposed to each other in the circumferential direction increases as approaching the radially inner side.

Figure 5:
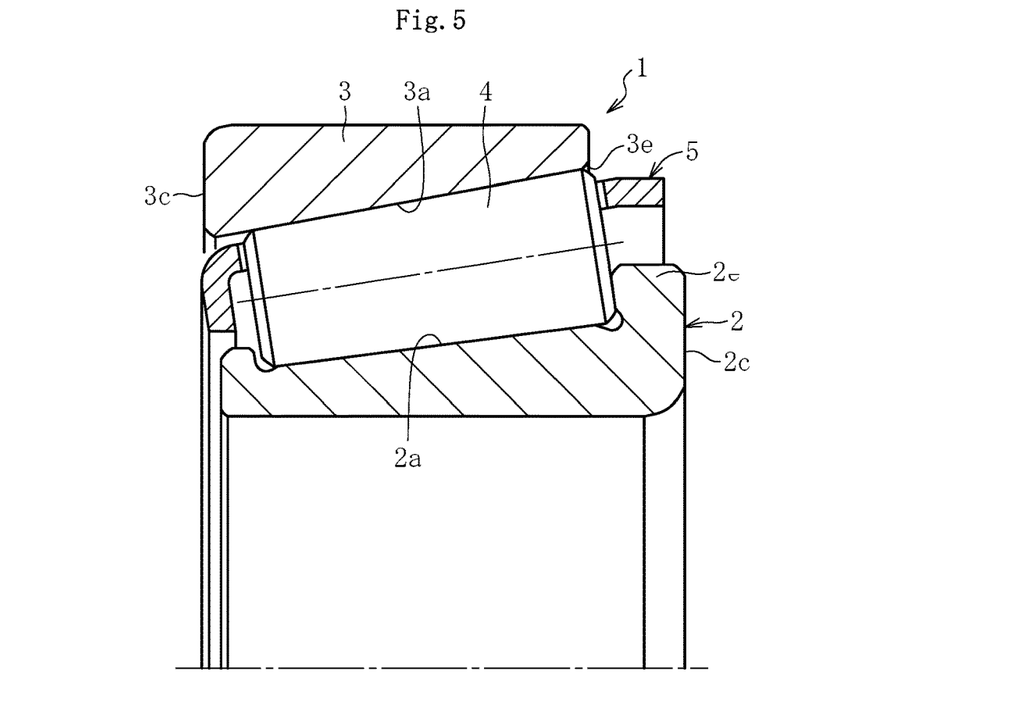
FIG. 5 is a sectional view of the tapered roller bearing of FIG. 1, which is taken along the axial direction, for illustrating a state in which the outer ring of the tapered roller bearing of FIG. 1 is moved in the axial direction.

The tapered roller bearing 1 allows the inner ring 2 and the outer ring 3 to rotate relative to each other while holding the large-diameter-side end surfaces 4e of the tapered rollers 4 in slide contact with the large-flange portion 2e of the inner ring 2. At this time, when preload loss occurs due to some cause, and the outer ring 3 is moved relative to the tapered roller 4 toward the small-diameter side (see FIG. 5), there is a fear in that the rolling surfaces 4a of the tapered rollers 4 may overhang from the raceway surface 3a of the outer ring 3 toward the large-diameter side to cause generation of an excessive edge load.

In view of the above, it is preferred that, under a state in which the inner ring 2, the outer ring 3, and the tapered rollers are arranged at normal positions (see FIG. 1), a generating-line-direction dimension $W_2$ of a region of the raceway surface 3a of the outer ring 3 on the large-diameter side from the rolling surfaces 4a of the tapered rollers 4, that is, a generating-line direction distance between the large-diameter-side end of the rolling surface 4a of the tapered roller 4 and the large-diameter-side end of the raceway surface 3a of the outer ring 3 be set large in consideration of the preload loss. Particularly in the case where the housing 10 is made of aluminum, the housing 10 involves a large amount of thermal expansion, and hence the preload of the tapered roller bearing 1 is liable to be lost. In such a case, it is preferred that the generating-line-direction dimension $W_2$ of the above-mentioned region be set to, for example, 0.6 mm or more.

In this embodiment, a distance $W_3$ (see FIG. 6) between an end surface 4d of the tapered roller 4 on the small-diameter side and the small-flange portion 2d of the inner ring 2 is set small in advance. Specifically, under the state in which the inner ring 2, the outer ring 3, and the tapered rollers 4 are arranged at the normal positions, the above-mentioned distance $W_3$ is set to 0.4 mm or less. With this configuration, even when the tapered rollers 4 are moved toward the small-diameter side due to some cause, the tapered rollers 4 are brought into abutment against the small-flange portion 2d in an early stage (see the dotted lines in FIG. 6). With this configuration, the amount of movement of the tapered rollers 4 toward the small-diameter side can be suppressed. Therefore, without extension of the raceway surface 3a of the outer ring 3 (in particular, the end portion curve 3a2 on the small-diameter side) toward the small-diameter side, overhanging of the roller surfaces 4a of the tapered rollers 4 from the raceway surface 3a of the outer ring 3 toward the small-diameter side can be prevented. When the above-mentioned distance $W_3$ is excessively small, oil is less likely to flow in through the gap formed between the end surfaces 4d of the tapered rollers 4 on the small-diameter side and the small-flange portion 2d of the inner ring 2. Therefore, it is preferred that the above-mentioned distance $W_3$ be set to 0.2 mm or larger.

Figure 7:
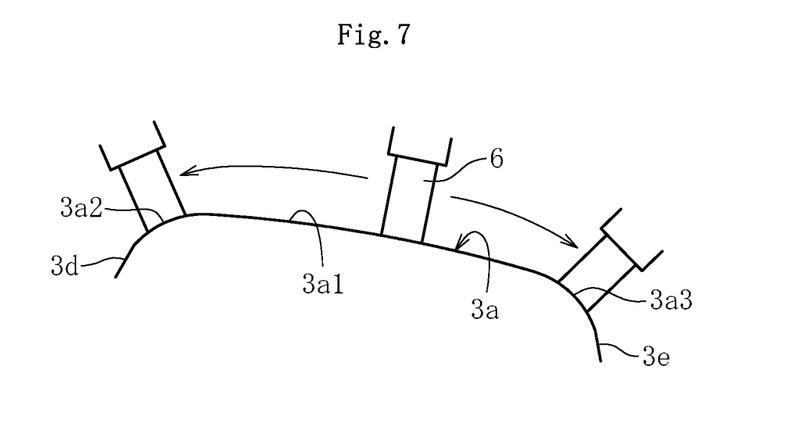
FIG. 7 is a side view for illustrating a state in which the raceway surface of the outer ring is subjected to superfinishing.

The raceway surface 2a of the inner ring 2, the raceway surface 3a of the outer ring 3, and the rolling surfaces 4a of the tapered rollers 4 are subjected to grinding, and thereafter are subjected to superfinishing. The superfinishing on the raceway surface 3a of the outer ring 3 is performed in the following manner. Under a state in which the outer ring 3 is rotated about a center axis thereof, as illustrated in FIG. 7, a grinding wheel 6 is pressed against the raceway surface 3a and reciprocated along the generating-line direction of the raceway surface 3a. At this time, while the grinding wheel 6 is reciprocated along the entire raceway surface 3a, the grinding wheel 6 may be finely vibrated in the generating-line direction. The grinding wheel 6 is pressed against the center curve 3a1 in such a manner. As a result, the distal end surface of the grinding wheel 6 is deformed to conform to the center curve 3a1, and the center curve 3a1 is polished. Then, the grinding wheel 6 is pressed against the end portion curves 3a2 and 3a3, with the result that the distal end surface of the grinding wheel 6 is deformed to conform to the end portion curves 3a2 and 3a3, and the end portion curves 3a2 and 3a3 are polished.

At this time, as described above, the difference between the curvature radius $R_1$ of the center curve 3a1 and each of the curvature radii $R_2$ and $R_3$ of the end portion curves 3a2 and 3a3 is suppressed to be relatively smaller ($R_2/R_1 \geq 0.02$ and $R_3/R_1 \geq 0.02$). Therefore, the amount of deformation of the distal end of the grinding wheel 6 is relatively smaller when the grinding wheel 6 moves from the center curve 3a1 to the end portion curves 3a2 and 3a3 or moves from the end portion curves 3a2 and 3a3 to the center curve 3a1. With this, the grinding wheel 6 conforms to the curves 3a1, 3a2, and 3a3 in an early stage. As a result, machining is performed with high efficiency, and the cycle time for the superfinishing is shortened, thereby improving the productivity of the tapered roller bearing 1.

The present invention is not limited to the above-mentioned embodiment. For example, in the above-mentioned embodiment, description is made of the case where all of the center curve 3a1 and the end portion curves 3a2 and 3a3 of the raceway surface 3a of the outer ring 3 are arcuate curves. However, the present invention is not limited to this case. Any or all of those curves may be non-arcuate curves (for example, logarithmic curves). For example, the center curve 3a1 may be an arcuate curve, and both end portion curves 3a2 and 3a3 may be logarithmic curves. Further, the curvature radius $R_2$ of the end portion curve 3a2 on the small-diameter side and the curvature radius $R_3$ of the end portion curve 3a3 on the large-diameter side may be equal to or different from each other.

In order to verify the effect of the present invention, the following test was conducted. First, various types of tapered roller bearings having different design dimensions (in particular, factors of the outer ring raceway surface) were prepared, and were identified as Examples 1 to 8 and Comparative Examples 1 to 5. Each tapered roller bearing had the same configuration as that of the embodiment illustrated in FIG. 1 to FIG. 3, and design dimensions of respective parts are shown in the following Table 1. Research was made on the following Items (1) to (3) for those tapered roller bearings.

TABLE 1

| | Design dimensions | | | | | | | | | | | | | Bearing functional property | | |
|---|---|---|---|---|---|---|---|---|---|---|---|---|---|---|---|---|
| | | | | | | | | | | | | | | (1) | (2) | (3) |
| | A | B | $L_1$ | $L_2$ | $L_3$ | $R_1$ | $R_2$ | $R_3$ | $R_2/R_1$ $R_3/R_1$ | $D_1$ | $D_2$ | $W_1$ | $W_2$ | $W_3$ | Cycle time | Contact pressure | Roller position |
| Example 1 | 70 | 15 | 9.1 | 2.6 | 2.1 | 3450 | 100 | 100 | 0.029 | 0.037 | 0.025 | 0.5 | 0.8 | 0.3 | ○ | ○ | ○ |
| Example 2 | 75 | 17 | 11.2 | 2.8 | 2.4 | 5300 | 150 | 150 | 0.028 | 0.029 | 0.022 | 0.5 | 0.67 | 0.31 | ○ | ○ | ○ |
| Example 3 | 70 | 23 | 15.1 | 4.3 | 3.1 | 9500 | 200 | 200 | 0.021 | 0.050 | 0.026 | 0.7 | 0.7 | 0.2 | ○ | ○ | ○ |
| Example 4 | 80 | 14.8 | 8.4 | 3.2 | 2.5 | 2200 | 100 | 100 | 0.045 | 0.057 | 0.036 | 0.5 | 0.9 | 0.25 | ○ | ○ | ○ |
| Example 5 | 69 | 12.5 | 7.2 | 2.3 | 1.8 | 1300 | 80 | 80 | 0.062 | 0.039 | 0.025 | 0.5 | 0.9 | 0.3 | ○ | ○ | ○ |
| Example 6 | 66 | 12.4 | 6.3 | 2.1 | 1.7 | 1000 | 60 | 60 | 0.060 | 0.043 | 0.029 | 0.5 | 0.8 | 0.3 | ○ | ○ | ○ |
| Example 7 | 66 | 12.4 | 6.3 | 2.1 | 1.7 | 1700 | 40 | 40 | 0.024 | 0.059 | 0.039 | 1.2 | 0.45 | 0.7 | ○ | ○ | x |
| Example 8 | 70 | 15 | 9.1 | 2.6 | 2.1 | 3450 | 300 | 300 | 0.087 | 0.015 | 0.010 | 1.2 | 0.5 | 0.5 | ○ | x | x |
| Comparative Example 1 | 70 | 15 | 9.1 | 2.6 | 2.1 | 3450 | 50 | 50 | 0.014 | 0.071 | 0.047 | 1.2 | 0.5 | 0.5 | x | ○ | x |
| Comparative Example 2 | 75 | 17 | 11.2 | 2.8 | 2.4 | 5300 | 50 | 50 | 0.009 | 0.081 | 0.060 | 1.5 | 0.3 | 0.6 | x | x | x |
| Comparative Example 3 | 70 | 23 | 15.1 | 4.3 | 3.1 | 14300 | 80 | 80 | 0.006 | 0.118 | 0.062 | 1 | 0.5 | 0.6 | x | ○ | x |
| Comparative Example 4 | 80 | 14.8 | 8.4 | 3.2 | 2.5 | 4400 | 40 | 40 | 0.009 | 0.131 | 0.081 | 1.2 | 0.45 | 0.5 | x | x | x |
| Comparative Example 5 | 69 | 12.5 | 7.2 | 2.3 | 1.8 | 2200 | 40 | 40 | 0.018 | 0.070 | 0.043 | 1 | 0.35 | 0.5 | x | x | x |

A (mm): Outer diameter dimension of the outer ring 3
B (mm): Axial width of the outer ring 3
$L_1$ (mm): Generating-line-direction dimension of the center curve 3a1 of the raceway surface 3a of the outer ring 3
$L_2$ (mm): Generating-line-direction dimension of the end portion curve 3a2 on the small-diameter side of the raceway surface 3a of the outer ring 3
$L_3$ (mm): Generating-line-direction dimension of the end portion curve 3a3 on the large-diameter side of the raceway surface 3a of the outer ring 3
$R_1$ (mm): Curvature radius of the center curve 3a1 of the raceway surface 3a of the outer ring 3
$R_2$ (mm): Curvature radius of the end portion curve 3a2 on the small-diameter side of the raceway surface 3a of the outer ring 3
$R_3$ (mm): Curvature radius of the end portion curve 3a3 on the large-diameter side of the raceway surface 3a of the outer ring 3
$D_1$ (mm): Drop amount of the end portion curve 3a2 on the small-diameter side of the raceway surface 3a of the outer ring 3
$D_2$ (mm): Drop amount of the end portion curve 3a3 on the large-diameter side of the raceway surface 3a of the outer ring 3
$W_1$ (mm): Axial width of the chamfered portion 3d on the small-diameter side of the outer ring 3
$W_2$ (mm): Generating-line-direction dimension of the region of the raceway surface 3a of the outer ring 3 on the large-diameter side from the rolling surface 4a of the tapered roller 4
$W_3$ (mm): Distance between the end surface 4d of the tapered roller 4 on the small-diameter side and the small-flange portion 2d of the inner ring 2

(1) Cycle Time for Superfinishing of Outer Ring Raceway Surface

The raceway surface of the outer ring of each tapered roller bearing was subjected to the superfinishing by the method illustrated in FIG. 7, and the cycle time for the superfinishing was measured. As a determination criterion, the mark of "○" was given when the cycle time was 30 seconds or less, and the mark of "x" was given when the cycle time exceeded 30 seconds.

(2) Surface Pressure (Edge Stress)

The inner ring was rotated under a state in which a predetermined preload was applied to the inner ring and the outer ring of each tapered roller bearing, and the surface pressure during the rotation was measured. The measurement of the surface pressure was performed by measuring the applied load through residual stress measurement with use of an X-ray. The edge portion at which the end portions of the raceway surfaces of the inner ring and the outer ring and the rollers are held in contact was subjected to the measurement. As a determination criterion, the mark of "○" was given when the surface pressure was 4,000 MPa or less, and the mark of "x" was given when the surface pressure exceeded 4,000 MPa.

(3) Position of Tapered Roller During Preload Loss

The inner ring was rotated under the state in which the predetermined preload was applied to the inner ring and the outer ring of the tapered roller bearing, and the presence or absence of a linear edge contact mark, which may be formed at the time of overhanging of the roller from the outer ring raceway surface large-diameter side, on the roller rolling surface radially outer side was checked. When the linear edge contact mark was formed on the roller large-diameter-side rolling surface, the mark of "x" was given.

As shown in Table 1, in Examples 1 to 8 in which each of curvature radius ratios $R_2/R_1$ and $R_3/R_1$ of the end portion curves to the center curve of the outer ring raceway surface was set to 0.02 or more and in which each of the drop amounts of the end portion curves was set 0.07 mm or less, the cycle time for the superfinishing of the outer ring raceway surface was 30 seconds or less. In contrast, in Examples 1 to 5 in which each of the curvature radius ratios $R_2/R_1$ and $R_3/R_1$ was less than 0.02 and in which each of the drop amounts of the end portion curves was more than 0.07 mm, the cycle time for the superfinishing of the outer ring raceway surface was longer than 30 seconds. Further, in Examples 4, 5, 6, and 8 in which each of the curvature radius ratios $R_2/R_1$ and $R_3/R_1$ was especially larger, that is, was set to 0.04 or more, the cycle time for the superfinishing was especially shorter.

Further, in Examples 1 to 6, each of the drop amounts of the end portion curves of the outer ring raceway surface was set to 0.02 mm or more. The width $W_2$ in the region of the outer ring raceway surface on the large-diameter side from the tapered roller was set to 0.6 mm or more. The distance $W_3$ between the small-flange portion of the inner ring and the end surface of the tapered roller on the small-diameter side was set to 0.4 mm or less. In Examples 1 to 6, the edge stress was not generated, and there was no abnormality in the surface pressure distribution also during the preload loss. Thus, the tapered roller bearings of Examples 1 to 6 had sufficient durability.

In contrast, in Example 8, each of the drop amounts of the end portion curves of the outer ring raceway surface was less than 0.02 mm. Consequently, the excessive edge stress was generated, and the edge portion was damaged. In Example 7 and Comparative Examples 1 to 5, each of the drop amounts of the end portion curves of the outer ring raceway surface was set to 0.02 mm or more. However, the width $W_2$ of the region of the outer ring raceway surface on the large-diameter side from the tapered roller was less than 0.6 mm, and the distance $W_3$ between the small-flange portion of the inner ring and the end surface of the tapered roller on the small-diameter side exceeded 0.4 mm. Consequently, during the preload loss, the rolling surface of the tapered roller overhung relative to the raceway surface of the outer ring, and the edge of the end portion of the raceway surface was brought into contact with the roller rolling surface. As a result, the edge portion of the roller rolling surface or the raceway surfaces of the inner ring and the outer ring were damaged.

REFERENCE SIGNS LIST 1 tapered roller bearing
2 inner ring
2a raceway surface
2d small-flange portion
2e large-flange portion
3 outer ring
3a raceway surface
3a1 center curve
3a2, 3a3 end portion curve
3d, 3e chamfered portion
4 tapered roller
4a rolling surface
5 cage
10 housing
20 shaft
30 shim

The invention claimed is:

1. A tapered roller bearing, comprising:

an inner ring comprising a raceway surface having a tapered shape on an outer peripheral surface of the inner ring;

an outer ring comprising a raceway surface having a tapered shape on an inner peripheral surface of the outer ring;

a plurality of tapered rollers, which are arranged between the raceway surface of the inner ring and the raceway surface of the outer ring so as to be rollable, each of the plurality of tapered rollers comprising an outer peripheral surface having a rolling surface with a tapered shape; and a cage which is configured to retain the plurality of tapered rollers at predetermined intervals, wherein the raceway surface of the outer ring comprises a composite crowning surface, the composite crowning surface comprising a center curve, which is formed at a center portion in a generating-line direction and has a curvature radius $R_1$, and end portion curves, which are formed on both sides of the center curve in the generating-line direction, one of the end portion curves having a curvature radius $R_2$ that is smaller than the curvature radius $R_1$ of the center curve, and an other of the end portion curves having a curvature radius $R_3$ that is smaller than the curvature radius $R_1$ of the center curve, wherein the raceway surface of the outer ring is entirely subjected to superfinishing, and wherein each of a ratio $R_2/R_1$ of the curvature radius $R_2$ of the one end portion curve to the curvature radius $R_1$ of the center curve and a ratio $R_3/R_1$ of the curvature radius $R_3$ of the other end portion curve to the curvature radius $R_1$ of the center curve is set to 0.02 or more, and each of drop amounts of the end portion curves is set to 0.02 mm or more.

2. The tapered roller bearing according to claim 1, wherein, under a state in which an appropriate preload in an axial direction is applied to the inner ring and the outer ring, a generating-line-direction dimension of a region of the raceway surface of the outer ring on a large-diameter side from the rolling surfaces of the plurality of tapered rollers is set to 0.6 mm or more.

3. The tapered roller bearing according to claim 1, wherein the inner ring comprises a small-flange portion which is formed on a small-diameter side of the raceway surface of the inner ring, and wherein, under a state in which an appropriate preload in an axial direction is applied to the inner ring and the outer ring, a distance between a small-diameter-side end surface of each of the plurality of tapered rollers and the small-flange portion of the inner ring is set to 0.4 mm or less.

4. The tapered roller bearing according to claim 1, wherein the outer ring comprises a chamfered portion formed on a small-diameter-side end portion of the inner peripheral surface of the outer ring, the chamfered portion having an axial width of 0.5 mm or more.

5. The tapered roller bearing according to claim 1, wherein the outer ring comprises a cylindrical surface formed between a chamfered portion, which is formed on a small-diameter-side end portion of the inner peripheral surface of the outer ring, and the raceway surface of the outer ring.

* * * * *